(12) United States Patent
Ni et al.

(10) Patent No.: US 11,626,820 B2
(45) Date of Patent: Apr. 11, 2023

(54) ROTARY IMPACT TOOL AND CONTROL METHOD THEREOF

(71) Applicant: Nanjing Chervon Industry Co., Ltd., Nanjing (CN)

(72) Inventors: Lianghua Ni, Nanjing (CN); Baofeng Fan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 654 days.

(21) Appl. No.: 16/659,804

(22) Filed: Oct. 22, 2019

(65) Prior Publication Data

US 2020/0161994 A1 May 21, 2020

(30) Foreign Application Priority Data

Nov. 15, 2018 (CN) .......................... 201811358273.8

(51) Int. Cl.
*B25B 21/00* (2006.01)
*H02P 6/15* (2016.01)
*B25B 21/02* (2006.01)

(52) U.S. Cl.
CPC .............. *H02P 6/153* (2016.02); *B25B 21/02* (2013.01)

(58) Field of Classification Search
CPC ....... B25B 21/00; B25B 21/026; B25B 23/00; B25B 23/14; B25B 23/1425; B25B 23/1405; H02P 6/153
See application file for complete search history.

(56) References Cited

U.S. PATENT DOCUMENTS

| 4,368,784 | A | * | 1/1983 | Wunsch | B25B 23/147 |
| | | | | | 81/464 |
| 11,095,238 | B2 | * | 8/2021 | Li | H02P 6/16 |
| 2011/0248583 | A1 | * | 10/2011 | O'Banion | H02K 5/18 |
| | | | | | 29/700 |
| 2012/0292065 | A1 | * | 11/2012 | Hoshi | B25B 21/02 |
| | | | | | 173/93 |
| 2016/0001411 | A1 | * | 1/2016 | Alberti | B25B 21/00 |
| | | | | | 700/188 |
| 2021/0119559 | A1 | * | 4/2021 | Li | B25F 5/00 |

\* cited by examiner

*Primary Examiner* — Lee D Wilson
(74) *Attorney, Agent, or Firm* — Greenberg Traurig, LLP

(57) ABSTRACT

A rotary impact tool includes an impact assembly, a brushless motor, a transmission assembly, a drive circuitry, and a controller. The controller is configured to acquire a commutation interval of the brushless motor, output a first control signal to the drive circuitry causing the brushless motor to operate at a preset initial speed, and output a second control signal to the drive circuitry to gradually increase a rotational speed of the brushless motor to a preset final speed, when a commutation interval of the brushless motor becomes greater than or equal to a preset time threshold, where the preset initial speed is less than the preset final speed.

13 Claims, 9 Drawing Sheets

ROTARY IMPACT TOOL AND CONTROL METHOD THEREOF

RELATED APPLICATION INFORMATION

This application claims the benefit under 35 U.S.C. § 119(a) of Chinese Patent Application No. CN 201811358273.8, filed on Nov. 15, 2018, the disclosure of which is incorporated herein by reference in its entirety.

TECHNICAL FIELD

The present disclosure relates to a rotary impact tool and a control method thereof, in particular, to a rotary impact tool and a control method thereof that can prevent an object from separating from a tool head after an impact occurs.

BACKGROUND

A rotary impact tool typically has an impact assembly, which generally includes an impact mechanism, a spring, a hammer portion, an anvil portion, and so on. The impact mechanism drives the hammer portion to perform a reciprocating motion along a main shaft, while the hammer portion impacts the anvil portion under the action of the spring, and the impact force is finally transmitted to an output shaft and a tool accessory. Rotary impact tools use the impact of the hammer portion on the anvil portion to fix the tool accessories such as a screw or a bolt onto a material, such as a plate or wood.

With an existing rotary impact tool, if the operator triggers an operating member such as a trigger with a maximum operation amount when the tool starts operating, then the controller would output a PWM signal with a maximum duty ratio to control a drive circuitry to drive the motor to rotate at a high speed. In this case, the screw or bolt is easy to separate from a head or an end of the tool, making it unable to operate normally. In addition, when using the above-mentioned conventional rotary impact tool, if the tool accessory such as a screw is relatively long and the screw is impacted with a final state from the beginning before the screw has fully entered the material, the long screw may go askew due to the suddenly changed load at the start of the impact, such that the screw would be separated from the material or the tool head, resulting in damage to the material, the tool head and the screw.

For an impact screwdriver, when an existing impact screwdriver starts to operate, the trigger is manually pressed to different positions or stroke distances to achieve a low-speed working condition desired by a user, so that the motor has a low speed and the screw mounted in the tool head or the end fixture enters the wood at a relatively low speed to achieve the effect of holding the screw, and then the motor operates normally after the screw is stabilized. In the nail holding stage, however, since the user manually adjusts a rotational speed of the motor through an operating member such as a trigger, the speed may be unsteady due to shaking of the hand such that the screw is easy to go askew or fall off. Furthermore, the operator also needs to hold the screw with his hand in order that the screw can smoothly enter the material, which is troublesome to operate.

SUMMARY

In order to solve the problems in the related art, the present disclosure aims to provide a rotary impact tool and a control method thereof, which can prevent an object from separating from a tool head after an impact occurs.

In order to realize the purposes, the present disclosure uses the following technical solutions: a rotary impact tool, which includes an impact assembly configured for generating an impact force; a brushless motor configured for outputting a driving force to drive the impact assembly to generate the impact force; a transmission assembly connected to the brushless motor and to the impact assembly and configured for transmitting the driving force of the brushless motor to the impact assembly; a drive circuitry electrically connected to the brushless motor and configured for driving the brushless motor to output the driving force; and a controller configured to: acquire a commutation interval of the brushless motor; output a first control signal to the drive circuitry causing the brushless motor to operate at a preset initial speed; and output a second control signal to the drive circuitry to gradually increase a rotational speed of the brushless motor to a preset final speed, when the commutation interval of the brushless motor becomes greater than or equal to a preset time threshold; the preset initial speed is less than the preset final speed.

Optionally, the brushless motor includes a rotor, and the controller is configured to acquire a position of the rotor of the brushless motor; and determine the commutation interval of the brushless motor based on a change of the position of the rotor of the brushless motor.

Optionally, the controller is configured to determine the commutation interval of the brushless motor based on a time period during which the rotor of the brushless motor rotates from a first position to a second position, where the first position is a position where the brushless motor starts a commutation, and the second position is a position where the brushless motor starts a next commutation.

Optionally, a control signal of the brushless motor operating at no load is defined as a third control signal, the first control signal is a first pulse width modulation (PWM) signal and the third control signal is a third PWM signal. When a duty ratio of the first PWM signal is the same as that of the third PWM signal, the preset time threshold is greater than the commutation interval of the brushless motor operating at no load.

Optionally, the impact assembly includes a hammer portion; an anvil portion arranged corresponding to the hammer portion; and a spring arranged between the transmission assembly and the hammer portion and the spring is configured for being compressed by the transmission assembly to push the hammer portion to impact the anvil portion. The preset time threshold is less than or equal to a commutation interval of the spring measured from the point of being compressed to the point of generating a maximum elastic force; the maximum elastic force is operative to drive the hammer portion to impact the anvil portion.

Optionally, the preset time threshold assumes a value that lies in the range of 1 millisecond to 50 milliseconds.

Optionally, the first control signal is a first PWM signal, the second control signal is a second PWM signal, and a duty ratio the first PWM signal is less than a duty ratio of the second PWM signal.

Optionally, the first PWM signal has a duty ratio that lies in the range of 10% to 30%.

Optionally, the rotary impact tool further includes a battery pack configured for supplying power to the rotary impact tool, where the battery pack is detachably mounted onto the rotary impact tool.

Optionally, the rotary impact tool further includes a voltage detection circuitry configured for detecting a voltage of the battery pack and the controller is further configured to: adjust the first control signal output to the drive circuitry according to the voltage of the battery pack to keep the initial speed of the brushless motor substantially unchanged.

Optionally, the first control signal is a PWM signal; and the controller is configured to: output the first control signal having a first duty ratio to the drive circuitry causing the brushless motor to operate at a first initial speed, when the voltage of the battery pack becomes greater than or equal to a preset voltage threshold; and output the first control signal having a second duty ratio to the drive circuitry causing the brushless motor to operate at a second initial speed, when the voltage of the battery pack becomes less than the preset voltage threshold, where the first initial speed is equal to or substantially equal to the second initial speed, and the initial speed is selected as one of the first initial speed and the second initial speed.

Optionally, the preset voltage threshold assumes a value that lies in the range of 0.4 to 0.8 times a rated voltage of the rotary impact tool.

Optionally, the rotary impact tool is an impact screwdriver.

There is further provided a control method of a rotary impact tool, which includes a brushless motor, and the control method includes the following operations: the brushless motor is caused to operate at an initial speed; a commutation interval of the brushless motor is acquired; and when the commutation interval of the brushless motor becomes greater than or equal to a preset time threshold, a rotational speed of the brushless motor is gradually increased to a final speed.

Optionally, the brushless motor includes a rotor and the control method further includes the following operations: a position of the rotor of the brushless motor is acquired; and the commutation interval of the brushless motor is determined based on a change of the position of the rotor of the brushless motor.

Optionally, the commutation interval of the brushless motor is determined based on a time period during which the rotor of the brushless motor rotates from a first position to a second position, where the first position is a position where the brushless motor starts a commutation, and the second position is a position where the brushless motor starts a next commutation.

Optionally, the preset time threshold assumes a value that lies in the range of 1 millisecond to 50 milliseconds.

Optionally, the rotary impact tool further includes a battery pack configured for supplying power to the rotary impact tool and a drive circuitry configured for driving the brushless motor to output a driving force and the control method further includes the following operations: a voltage of the battery pack is acquired; and a control signal output to the drive circuitry is adjusted according to the voltage of the battery pack to keep the initial speed of the brushless motor substantially unchanged.

Optionally, when the voltage of the battery pack becomes greater than or equal to a preset voltage threshold, the control signal having a first duty ratio is output to the drive circuitry causing the brushless motor to operate at a first initial speed. When the voltage of the battery pack becomes less than the preset voltage threshold, the control signal having a second duty ratio is output to the drive circuitry causing the brushless motor to operate at a second initial speed, where the first initial speed is equal to or substantially equal to the second initial speed, and the initial speed is selected as one of the first initial speed and the second initial speed.

Optionally, the preset voltage threshold assumes a value that lies in the range of 0.4 to 0.8 times a rated voltage of the rotary impact tool.

The present disclosure has advantages that an automatic nail holding effect can be realized at a low speed without the need for a user to use their hands, and the operation is simpler. In addition, the impact is detected according to the commutation interval of the motor, which can be detected before it occurs, so it can be prevented that the object already falls off when it is detected after the impact, and additional electrical components or mechanical components are not required, so that the detection method is simple, convenient, reliable and has low cost.

DETAILED DESCRIPTION

The present disclosure will be described in detail below with reference to the drawings and specific examples.

Figure 1:
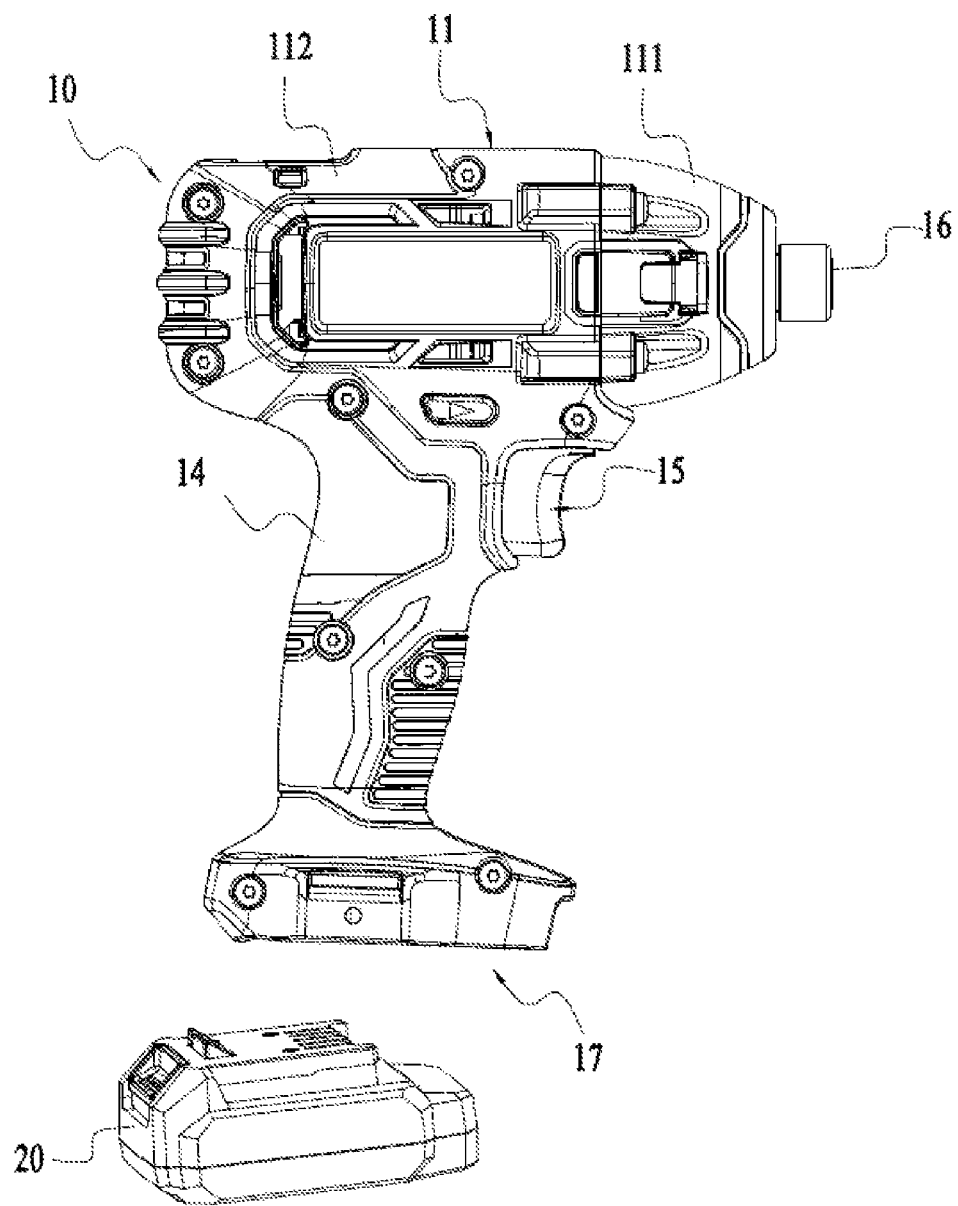
FIG. 1 is an external view of a rotary impact tool according to an example.

FIG. 1 is a schematic diagram of a rotary impact tool 10 of the present disclosure, where the impact tool 10 in FIG. 1 is a hand-held rotary impact tool, specifically, an impact screwdriver.

Figure 2:
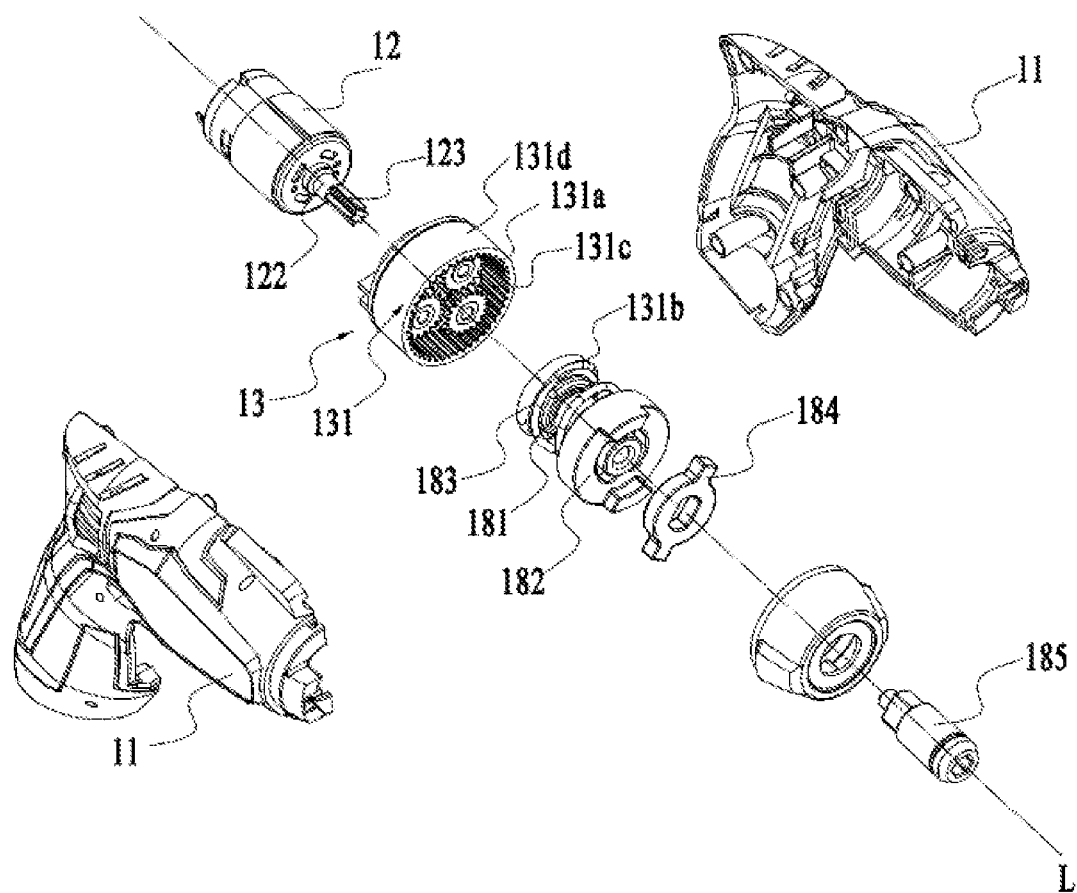
FIG. 2 is an exploded view of partial structure of the rotary impact tool shown in FIG. 1.
Figure 3:
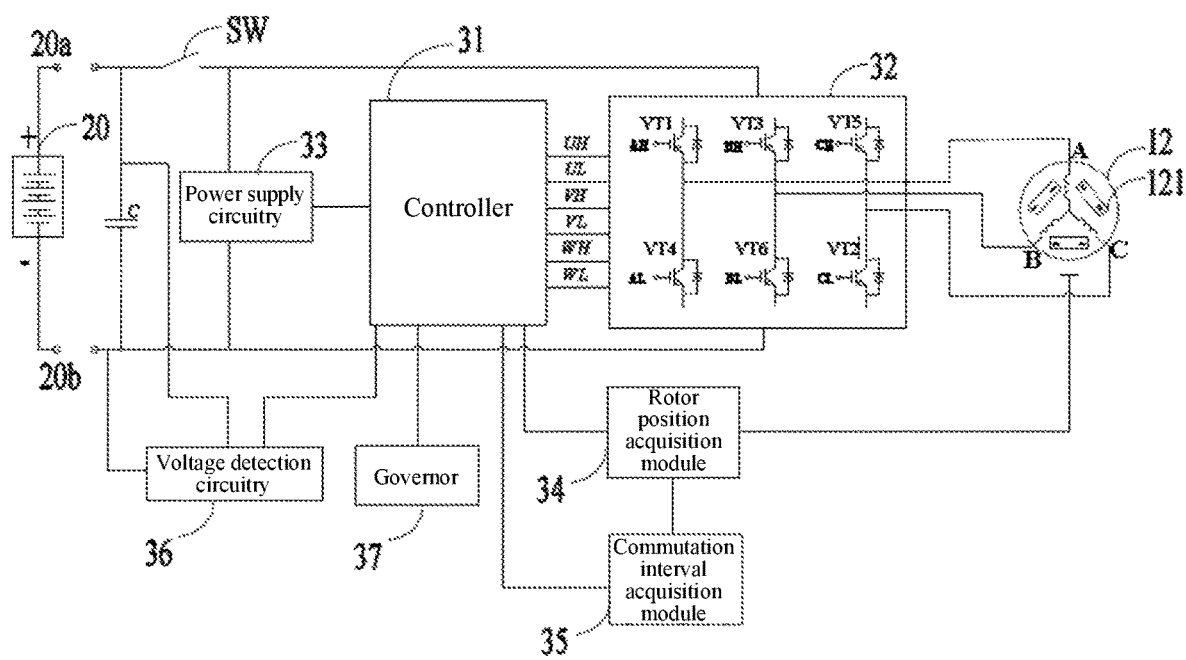
FIG. 3 is a circuit system diagram of a rotary impact tool according to an example.

Referring to FIGS. 1 to 2, the rotary impact tool 10 includes a housing 11; an impact assembly 18, which is configured for generating an impact force; a brushless motor 12, which is configured for outputting a driving force to drive the impact assembly 17 to generate the impact force, and the brushless motor 12 includes a rotor 121 (FIG. 3). Optionally, the rotary impact tool 10 further includes a transmission assembly 13 connected to the brushless motor 12 and the impact assembly 18, the impact assembly 18 is configured for transmitting the output of the brushless motor 12 to the impact assembly 18.

An accommodation space surrounding the housing 11 is formed, at least a part of the brushless motor 12 and a part of the transmission assembly 13 are accommodated in the accommodation space. A large amount of heat generated while the rotary impact tool 10 operates is transferred to a surface of the housing 11. Therefore, typically, the housing 11 includes a heat dissipation portion made of a heat conductive material. In this example, the heat dissipation portion is a front part of the housing 11 configured for accommodating the brushless motor 12 and the transmission assembly 13, i.e., a head housing 111, which is made of metallic aluminum with good heat conductivity to dissipate heat for the brushless motor 12 and the transmission assembly 13. In this example, the housing 11 further includes a second housing 112 fixedly connected to the head housing 111, the second housing 112 is located at a rear end of the rotary impact tool 10 relative to the head housing 111, and the second housing 112 is made of plastic; as a typical implementation, the head housing 111 and the second housing 112 of the housing 11 are both made of a thermally conductive material, such as metallic aluminum or the like; as another typical implementation, the head housing 111 and the second housing 112 of the housing 11 are integrally formed.

The rotary impact tool 10 further includes a handle 14 formed by the housing 11 for a user to hold. In some examples, the rotary impact tool 10 further includes an operating member 15, the operating member 15 is operative to initiate or stop the brushless motor 12, and arranged on the housing 11 or the handle 14.

The impact assembly 18, the transmission assembly 13 and the brushless motor 12 are sequentially arranged along a longitudinal axis L from front to back, which takes an end of the housing 11 remote from the handle 14 as the front end and an opposite end as the rear end.

The brushless motor 12 includes a motor shaft 122 providing a rotational output, a top end of the motor shaft 122 is arranged with a motor gear 123. The brushless motor 12 is used to transmit power to the transmission assembly 13 through the rotational output of the motor shaft 122 through a gear structure. The brushless motor 12 further includes a stator, a rotor 121 and windings, and the motor shaft 122 is driven by the rotor 121.

The transmission assembly 13 is connected to the brushless motor 12 and the impact assembly 18, and is configured for transmitting the power of the brushless motor 12 to the impact assembly 18. In some examples, the transmission assembly 13 includes a planetary gear reduction mechanism 131, whereby a rotational speed of the brushless motor 12 is reduced through the planetary gear reduction mechanism 131. In some examples, the transmission assembly 13 includes a planet wheel 131a, a planet carrier 131b, an inner ring gear 131c and a gear box 131d, the inner ring gear 131c is fixed relative to the gear box 131d, and the motor shaft 122 of the brushless motor 12 extends into the gear box 131d to mesh with the planet wheel 131a accommodated therein. An inner hole is provided on a base of the planet carrier 131b, and the inner hole is fixedly connected to an intermediate shaft 181 of the impact assembly 18 through interference fit, so that the intermediate shaft 181 always rotates along with the planet carrier 131b.

The impact assembly 18 is used to generate an impact force. The impact assembly 18 includes a hammer portion 182 associatively connected to the transmission assembly 13, an anvil portion 184 matching with the hammer portion 182 to receive an impact of the hammer portion 182, and a spring 183 arranged between the transmission assembly 13 and the hammer portion 182, and the spring 183 is configured for being compressed by the transmission assembly to push the hammer portion 182 to impact the anvil portion 184.

In some examples, the impact assembly 18 includes the hammer portion 182 mounted on the intermediate shaft 181, the spring 183 located between the hammer portion 182 and the planet carrier 131b, and a rolling ball V-groove impact mechanism (not shown in the figure) located at a joint between the hammer portion 182 and the intermediate shaft 181. For those of ordinary skill in the art, the above rolling ball V-groove impact mechanism is a well-known technology and will not be described in detail. A front end of the hammer portion 182 is also provided with the anvil portion 184. The impact assembly 18 further includes an output shaft 185 extending out of the front end of the gear box 131d and connected to the anvil portion 184. It is understood that the anvil portion 184 and the output shaft 185 may be integrally formed or separately formed as separate portions. A front end of the output shaft 185 is provided with an end member 16, which may be a sleeve head or a similar member, and it may be configured for installing an assembly, such as a screw.

An operation principle of the rotary impact tool 10 in the above examples will be described in detail below. The motor shaft 122 of the brushless motor 12 rotates, while the motor gear 123 on the motor shaft 122 drives the planet wheel 131a to rotate around a planet wheel pivot, meanwhile the planet wheel 131a creeps along an annular internal teeth of the ring gear 131c and revolves around an axis of the motor shaft 122. The revolution of the planet wheel 131a drives the planet carrier 131b to rotate and transmit the rotation to the intermediate shaft 181, the intermediate shaft 181 drives the hammer portion 182 to reciprocate in an axial direction through the rolling ball V-groove impact mechanism. At the same time, while the hammer portion 182 impacts the anvil portion 184 under the action of the spring 183 and finally transmits the impact force to the output shaft 185. For a person of ordinary skill in the art, the working principle of the above impact tool 10 is a well-known technology, which will not be described in detail.

That is, the rotational force of the brushless motor 12 is converted into a rotational impact force after passing through the transmission assembly 13 and the impact assembly 18 to be transmitted to a tool accessory, so that the end member 16 is rotationally impacted to fasten the screw into the material.

In some examples, the rotary impact tool 10 is powered by a direct-current (DC) power supply. More specifically, the rotary impact tool 10 may be powered by a battery pack 20 that cooperates with a corresponding power supply circuitry 33, such as a DC-DC conversion chip, to power the brushless motor 12 and circuit components on the circuit board. It should be understood by those skilled in the art that the rotary impact tool 10 may also use an alternating current (AC) power supply to supply power to various circuit components in cooperation with a corresponding rectifying circuitry, a filter circuitry, and a voltage regulation circuitry.

Optionally, the rotary impact tool 10 is powered by the battery pack 20 detachably mounted onto the rotary impact tool 10 to supply power to the rotary impact tool 10, and the battery pack 20 includes a housing and a battery core. The battery core is contained in the housing for storing energy, which may be repeatedly charged and discharged. The housing is formed with a connection interface, which is configured for corresponding connection with a connection portion 17 of the battery pack 20 of the rotary impact tool 10. The battery pack 20 includes a positive power supply terminal 20a and a negative power supply terminal 20b, which are configured for connection with an external circuit or an external device.

The operation of the rotary impact tool 10 also relies on a circuit system, which includes circuit components that are at least partially disposed on the circuit board. As an example the circuit board is located at the handle 14.

Referring to FIG. 3, as an example the circuit system of the rotary impact tool 10 includes a main switch SW, a controller 31, a drive circuitry 32, and a power supply circuitry 33.

The main switch SW is connected in series to the main circuit for enabling or prohibiting a current of the battery pack 20 from flowing to the rotary impact tool 10. An end of the main switch SW is electrically connected to a power supply terminal of the battery pack 20, and the other end is connected to the power supply circuitry 33 and the drive circuitry 32. When the main switch SW switches off, the power supply circuitry 33 and the drive circuitry 32 are powered off, the power supply circuitry 33 may not supply power to the controller 31, and the drive circuitry 32 may not operate. When the main switch SW switches on, the power supply circuitry 33 receives power, and the controller 31 controls the drive circuitry 32 to pass a current output by the battery pack 20 through the windings of the brushless motor 12 after receiving power from the power supply circuitry 33. The main switch SW is associatively connected to an operating member 15, and as an example, when the operating member 15 is pressed, the main switch SW switches on, and the brushless motor 12 initiates; when the operating member 15 is released, the main switch SW switches off, and the brushless motor 12 stops driving.

In some examples, the operating member 15 serves as a trigger, when the trigger is pressed with different strokes, the controller 31 controls the brushless motor 12 to output different rotational speeds correspondingly. As an example, when the trigger is released for a certain stroke, the main switch SW switches off, and when the trigger is pressed for a certain stroke, the main switch SW switches on.

Optionally, the rotary impact tool 10 further includes a governor 37 associatively connected to the trigger, and the governor 37 is connected to the controller 31. In some examples, the governor 37 may be a slide rheostat, the trigger is connected to a moving terminal of the slide rheostat, when the trigger is pressed with different strokes, a resistance value of the slide rheostat connected to the circuit changes, and a changed resistance value may be converted into a voltage signal through a circuit, thus the controller 31 may obtain a rotational speed of the brushless motor 12 desired by the operator according to the voltage signal of the governor 37 and a pre-stored voltage-tachometer/voltage-rotational speed formula, so that the controller 31 outputs a corresponding PWM signal to control a driving switch, so as to enable the brushless motor 12 to output the rotational speed desired by the operator.

The controller 31 is used to control the operating process of the rotary impact tool 10. Optionally, the controller 31 includes, for example, any one or combination of a single chip computer or a microcontroller (MCU), an ARM chip (reduced instruction set computing) microprocessor, an advanced RISC Machine, and a DSP chip (a general purpose digital signal processor).

The drive circuitry 32 is electrically connected to the controller 31 and the brushless motor 12 for driving the brushless motor 12 to output power. The drive circuitry 32 includes multiple switching elements, which constitute a bridge circuitry. Referring to FIG. 3, in this example, the drive circuitry 32 includes switching elements VT1, VT2, VT3, VT4, VT5, and VT6, and the switching elements VT1, VT2, VT3, VT4, VT5, and VT6 constitute a three-phase full bridge circuitry. Where, VT1, VT3, VT5 are defined as upper bridge switching elements, while VT2, VT4, VT6 as lower bridge switching elements. Three-phase windings A, B and C of the brushless motor 12 are connected to the battery pack 20 via the electrical bridge composed of the six switching elements VT1, VT2, VT3, VT4, VT5, and VT6. The switching elements VT1 to VT6 may be semiconductor devices, for example, metal-oxide semiconductor field effect transistors (MOSFETs) or insulated gate bipolar transistors (IGBTs).

The switching elements VT1 to VT6 as FETs is taken as an example, gate terminals of the switching elements serve as input terminals of a switching circuitry, which are electrically connected to the controller 31 respectively, and each drain or source of the switching elements is electrically connected to the windings of the brushless motor 12 respectively. The switching elements VT1 to VT6 sequentially change a conduction state according to a driving signal output by the controller 31, thereby a state of the voltage loaded on the windings of the brushless motor 12 is changed, an alternating magnetic field is generated, and the rotor 121 of the brushless motor 12 is driven to operate. The switching elements VT1 to VT6 may also be selected as IGBTs or other switching elements accordingly.

In order to enable the brushless motor 12 to rotate, the drive circuitry 32 may have multiple driving states. In each driving state, the windings of the brushless motor 12 may generate a magnetic field, the controller 31 controls the drive circuitry 32 to switch the driving state to rotate the magnetic field generated by the windings, so as to drive the rotor 121 to rotate, thereby realizing the driving of the brushless motor 12. In order to drive the brushless motor 12, the drive circuitry 32 has at least six driving states, for convenience of explanation, the driving states are indicated by connected terminals corresponding to the driving states. For example, if the controller 31 controls the drive circuitry 32 to connect a first phase winding A to the positive power supply terminal 20a, and a second phase winding B to the negative power supply terminal 20b, the driving state is denoted by AB, and if the controller 31 controls the drive circuitry 32 to connect the first phase winding A to the positive power supply terminal 20a, and the second phase winding B to the power supply terminal 20b, the driving state is denoted by BA, and this denoted driving manner is also applicable to a triangular connection solution of the windings. In addition, switching of the driving states may also be simply referred to as a commutation operation of the brushless motor 12. Obviously, the brushless motor 12 communicates once when the rotor 121 rotates every 60°. A time interval from a commutation to a next commutation of the brushless motor 12 is defined as the commutation interval. Taking six driving states as an example, the commutation interval includes a time period during which the rotor rotates an electrical angle of 60°.

The power supply circuitry 33 is electrically connected to the controller 32 for converting electric energy from a power supply source into electric energy for operation of the controller 31 and other circuit components. In this example, the power supply is the battery pack 20, so the power supply circuitry 33 may include a DC-DC conversion chip. It should be understood by those skilled in the art that the power supply is not limited to a scene in which the battery pack 20 is used, but the power supply to each circuit component may also be implemented through commercial power and AC power, combined with a corresponding rectifying circuit, a filter circuit and a voltage regulation circuit, at this time the power supply circuitry includes a rectifying circuit, a filter circuit and a voltage regulation circuit.

The rotary impact tool 10 also includes a rotor position acquisition module 34. An output end of the rotor position acquisition module 34 is connected to the controller 31, which module is configured for acquiring a position of the rotor 121 of the brushless motor 12 through detection or calculation, and sending an electric signal containing position information of the rotor 121 to the controller 31, and the controller 31 performs commutation control according to the position of the rotor 121.

Figure 4:
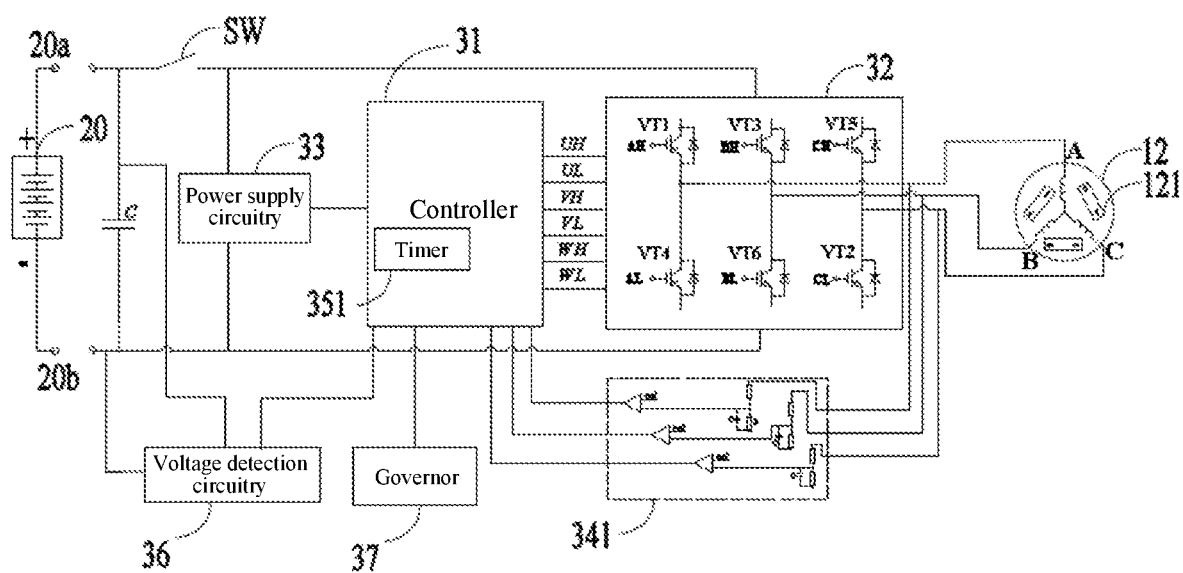
FIG. 4 is a circuit system diagram of a rotary impact tool according to an example.

In some examples, the rotor position acquisition module 34 acquires the position of the rotor 121 of the brushless motor 12 in a non-inductive manner, for example, a back electromotive force signal is detected by a bus current of the brushless motor 12, so that the position of the rotor 121 is detected according to the back electromotive force signal, at this time, the rotor position acquisition module 34 includes a back electromotive force detection circuitry 342 (FIG. 4). In some examples, referring to FIG. 5, the rotor position acquisition module 34 includes a position sensor 342, the position sensor includes, for example, three hall sensors, which are arranged along a circumferential direction of the rotor 121 of the brushless motor 12. When the rotor 121 turns in and out of a preset range, signals of the hall sensors change. It is defined that when the motor 121 turns into the preset range, an output signal of the position sensor 342 is defined as 1, while when the rotor 121 turns out of the preset range, the output signal of the position sensor 342 is defined as 0.

Figure 6:
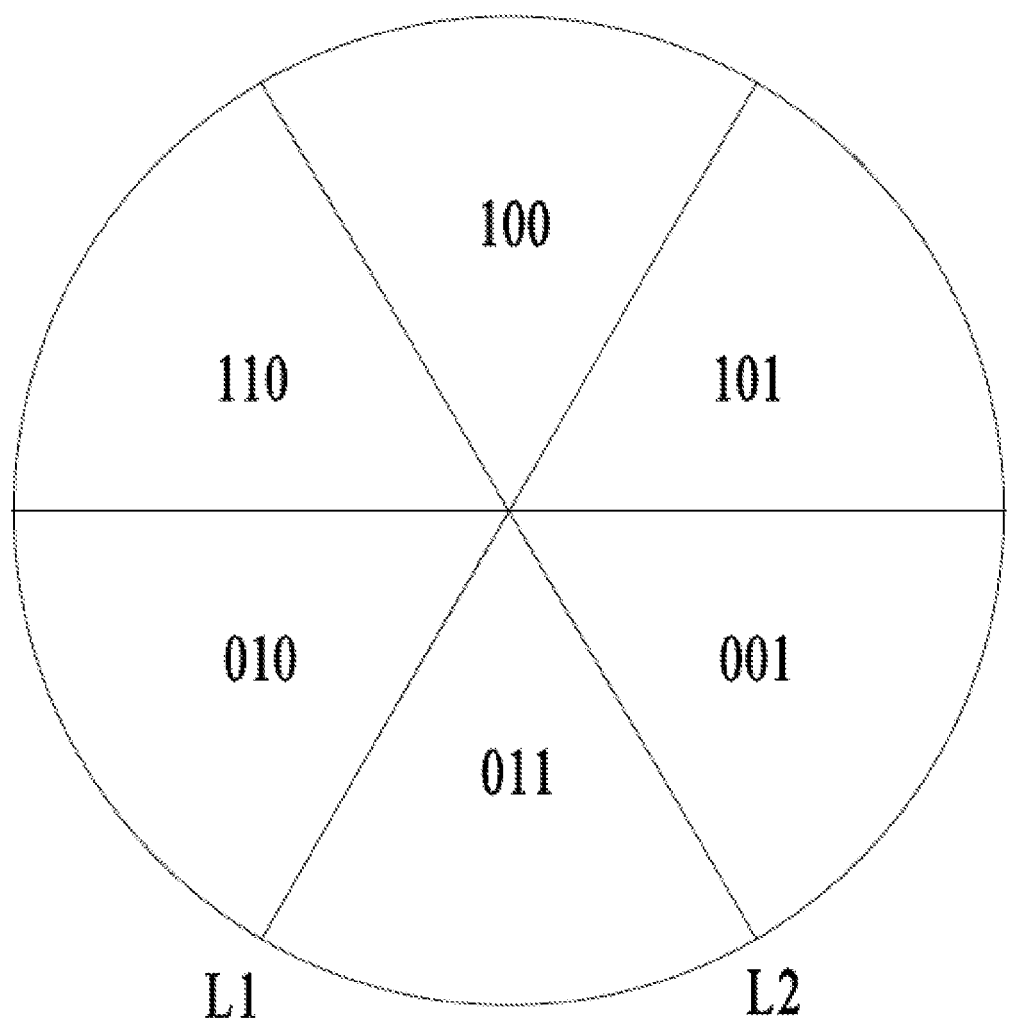
FIG. 6 is a schematic diagram illustrating the correspondences between a position sensor signal and a rotor position in a rotary impact tool.

The three hall sensors are separated from each other by a physical angle of 120°, when the rotor 121 rotates, the three hall sensors will generate position signals including six kinds of signal combinations, and if the three hall sensors are arranged in an order, six different signal combinations 100, 110, 010, 011, 001, 101 will occur (as shown in FIG. 6). In this way, the rotor position acquisition module 34 may output one of the above six position signals, and the controller 31 may know the position of the rotor 121 according to a position detection signal output by the rotor position acquisition module 34.

Figure 7:
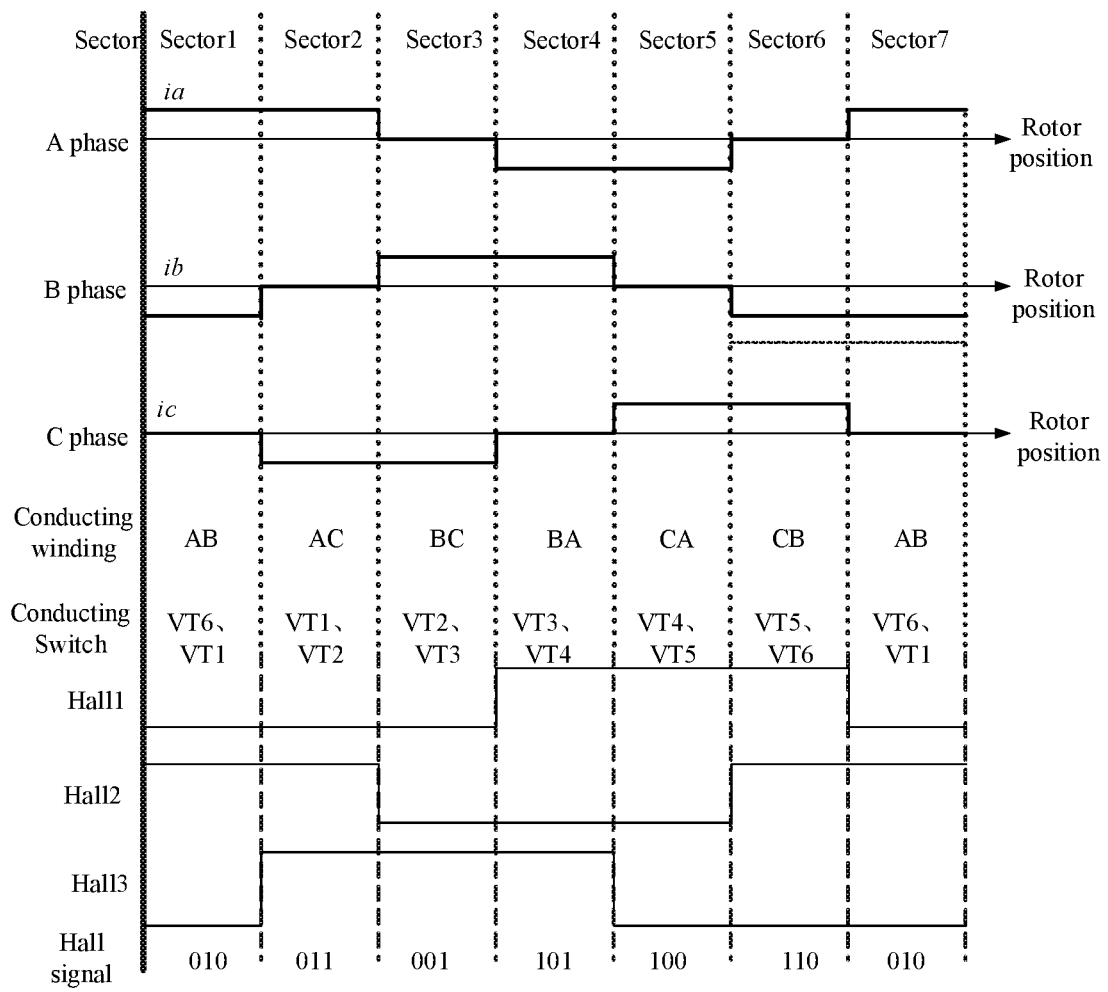
FIG. 7 is a schematic diagram illustrating the correspondences between a hall signal, a conducting switch, a driving state, and a sector where the rotor is located of a rotary impact tool under the driving state according to a first example.

In the circuit system of the rotary impact tool shown in FIG. 5, when the rotor 121 of the brushless motor 12 rotates, a rotor 121 located sector position, a hall signal of the hall sensors, conducting switching elements and a corresponding driving state are shown in FIG. 7 and table 1 as below.

TABLE 1

| Rotor sector position | 1 | 2 | 3 | 4 | 5 | 6 |
|---|---|---|---|---|---|---|
| Hall signal | 010 | 011 | 001 | 101 | 100 | 110 |
| Conducting switching element | VT6 VT1 | VT1 VT2 | VT2 VT3 | VT3 VT4 | VT4 VT5 | VT5 VT6 |
| Driving state | AB | AC | BC | BA | CA | CB |

Specifically, the hall sensors detect the position of the rotor 121, when it is detected that the rotor 121 rotates to sector 1, the rotor position acquisition module 34 outputs 010, the controller 31 controls the switching elements VT6 and VT1 to turn on, and AB phase winding correspondingly becomes conductive, and other switching elements turn off. When the rotor 121 rotates to sector 2, the rotor position acquisition module 34 outputs a signal of 011, and the controller 31 controls the switching elements VT1 and VT2 to turn on, AC phase winding correspondingly becomes conductive, and the other switching elements turn off. And so on, the rotor 121 sequentially passes through the sector 1, sector 2, sector 3, sector 4, sector 5, and sector 6, then returns back to the sector 1, the controller 31 controls the corresponding switching elements to turn on according to the sector position reached by the rotor 121 with reference to table 1 and FIG. 5, so that a corresponding winding becomes conductive, thus the winding generates an alternating magnetic field to drive the rotor 121 to rotate continuously.

The controller 31 determines the commutation interval of the brushless motor 12 based on a change of the position of the rotor 121 of the brushless motor 12, thereby it is controlled whether the brushless motor 12 changes the rotational speed according to the commutation interval. Compared with the traditional method of detecting the impact force generated by the impact assembly using an impact detection sensor (for example, the sensor detects the impact of the hammer portion on the anvil portion), the present disclosure detects the impact through the commutation interval of the brushless motor 12, which has a relatively low cost, simple and convenient detection method, and a reliable detection result, besides it can detect an imminent occurrence of the impact before the impact occurs.

The controller 31 is configured to acquire the position of the rotor 121 of the brushless motor 12, and output a first control signal to the drive circuitry 32 to drive the brushless motor 12 operating at an initial speed; when the commutation interval of the brushless motor 12 becomes greater than or equal to a preset time threshold, a second control signal is output to the drive circuitry 12 to gradually increase the rotational speed of the brushless motor 12 to the final speed, specifically, the rotational speed of the brushless motor 12 is gradually increased from the initial speed, until the brushless motor 12 operates at the final speed. The initial speed is less than the final speed.

Where, the first control signal is a PWM signal, the second control signal is a PWM signal, and the duty ratio of the first control signal is smaller than that of the second control signal. Optionally, the first PWM signal has a duty ratio that lies in the range of 10% to 30%. In some examples, the duty ratio of the first control signal is, for example, 20%. For convenience of explanation, the duty ratio of the first control signal is defined as an initial duty ratio, that is, the initial duty ratio lies in a value range of 10% to 30%. In addition, the duty ratio during the normal operation of the rotary impact tool 10 is defined as a final duty ratio, the final duty ratio is greater than the initial duty ratio, which lies in a value range of 90% to 100%, and the final duty ratio is, for example, 100%.

The duty ratio of the second control signal is gradually increased, specifically, the duty ratio of the second control signal is gradually increased from the initial duty ratio to the final duty ratio at a constant change rate or a variable change rate, and the duty ratio corresponds to the speed, that is, the initial duty ratio corresponds to the initial speed while the final duty ratio corresponds to the final speed. For example, if the initial duty ratio is 20% and the final duty ratio is 100%, the duty ratio of the second control signal is gradually increased from 20% to 100%, and the rotational speed of the brushless motor 12 is gradually increased from the initial speed corresponding to the initial duty ratio to the final speed corresponding to the final duty ratio. Optionally, a ratio of the initial duty ratio to the final duty ratio lies in a value range of 0.1 to 0.4, and a ratio of the initial speed to the final speed lies in a value range of 0.1 to 0.4.

In other words, the controller 31 controls the brushless motor 12 to operate at the initial speed first, when the commutation interval of the brushless motor 12 is greater than or equal to the preset time threshold, the controller 31 controls the drive circuitry 32 to gradually increase the rotational speed of the brushless motor 12, until the brushless motor 12 operates at the final speed in the final state, and the brushless motor 12 is controlled to stop driving after the screw is driven to an expected position of the material.

In this example, the first control signal and the second control signal are control signals, when the brushless motor 12 operates under load. That is, the rotary impact tool 10 operates under load, and the rotary impact tool 10 contacts an object since it operates under load. It may be understood that the brushless motor 12 operates at no load, when it is not in contact with an object.

A control signal of the brushless motor 12 operating at no load is defined as a third control signal, the first control signal is a PWM signal, the third control signal is a PWM signal; when a duty ratio of the first control signal is as same as that of the third control signal, the preset time threshold is greater than the commutation interval of the brushless motor operating at no load.

The preset time threshold is less than or equal to the commutation interval of the spring 183 measured from the point of being compressed to the point generating a maximum elastic force. The maximum elastic force causes the hammer portion 182 to impact the anvil portion 184. This has advantages that the impact can be detected before the hammer portion 182 impacts the anvil portion 184, thus it is avoided that after an occurrence of unfavorable phenomena such as falling off of the object occurs, the rotational speed of the brushless motor 12 is adjusted, which is more reliable and safer.

For example, if the duty ratio of the control signal is 20%, the commutation interval of the brushless motor 12 operating at no load is 2 milliseconds, and the commutation interval of the brushless motor 12 is 20 milliseconds, when the spring is compressed to the point of generating the maximum elastic force, the preset time threshold is set to be 2 milliseconds or more and 20 milliseconds or less.

In some examples, the preset time threshold assumes a value that lies in the range of 1 millisecond to 50 milliseconds. In some examples, the preset time threshold assumes a value that lies in the range of 1 millisecond to 20 milliseconds. In some examples, the preset time threshold assumes a value that lies in the range of 1 millisecond to 10 milliseconds.

Optionally, the rotary impact tool 10 further includes a commutation interval acquisition module 35. The commutation interval acquisition module 35 is configured for acquiring the commutation interval of the brushless motor 12 and is connected to the controller 31.

The commutation interval acquisition module 35 is connected to the rotor position acquisition module 34, which detects the commutation interval of the brushless motor 12 using the position of the rotor 121 at different time periods acquired by a position measurement unit 64, which has advantages that compared with the traditional method of detecting the impact force generated by the impact assembly using an impact detection sensor (for example, the sensor detects the impact of the hammer portion on the anvil portion), the method according to the present application has a relatively low detection cost, simple detection method and a reliable detection result.

The commutation time acquisition module 35 includes a timer for timing the commutation interval of the brushless motor 12. The timer of the commutation interval acquisition module 35 may be a timer 351 integrated inside the controller 31 (as shown in FIG. 4) or may include a separate timer 352 (as shown in FIG. 5). When the timer of the commutation interval acquisition module 35 may be integrated inside the controller 31, commutation interval detection may be directly implemented by using the timer inside the controller 31 without adding an additional timer, and the cost is lower. The commutation interval acquisition module 35 may also be an independent operation controller, such as a single chip microcomputer, etc., which is internally integrated with a timer.

Figure 5:
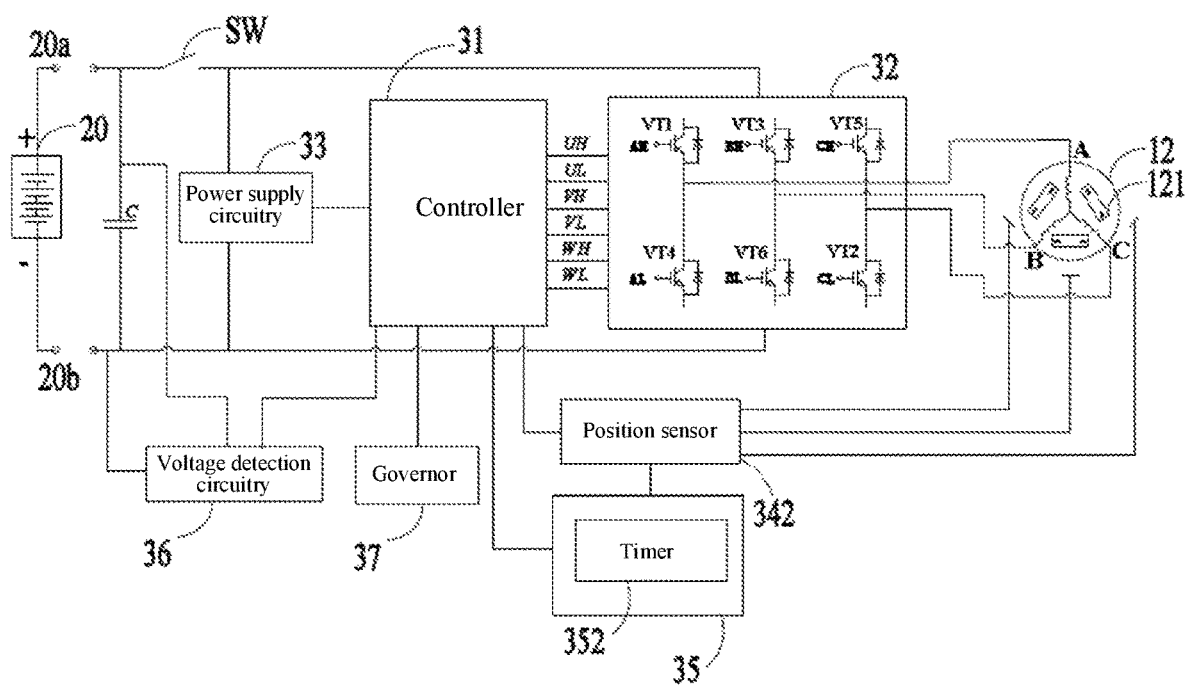
FIG. 5 is a circuit system diagram of a rotary impact tool according to an example.

Referring to FIG. 6, taking a position sensor 342 shown in FIG. 5 as an example, which is used to detect the position of the rotor 121, different signal combinations generated by the hall sensors correspond to different electrical angular positions where the rotor is located. Referring to table 1, for example, a position when the rotor 121 rotates to change the hall sensor signal combination from 010 to 011 is served as first position L1, a position when the rotor 121 rotates to change the hall sensor signal combination from 011 to 001 is served as second position L2, and a time period during which the rotor 121 rotates from the first position L1 to the second position L2 is the commutation interval of the brushless motor 12. The brushless motor 12 starts a commutation at the first position L1, while the brushless motor 12 switches from AB phase conduction to AC phase conduction, and the brushless motor 12 starts a next commutation at the second position L2, while the brushless motor 12 switches from the AC phase conduction to BC phase conduction.

Optionally, the timer of the commutation time acquisition module 35 starts timing or counting when the rotor 121 rotates to the first position L1; the timing stops when the rotor 121 rotates from the first position L1 to the second position L2, and a timing result is transmitted to the controller 31, which outputs a corresponding control signal to the drive circuitry 32 according to the timing result of the commutation interval acquisition module 35 to control the brushless motor 12 to change or keep the rotational speed unchanged.

As a specific example, the commutation interval detection performing by the commutation interval acquisition module 35 is specifically implemented as follows: when a signal output by the hall signal of the rotor position acquisition module 34 changes for the first time, for example, the hall signal changes from 010 to 011, the rotor 121 rotates to the first position L1, the timer of the commutation interval acquisition module 35 starts timing, when the signal output by the hall signal of the rotor position acquisition module 34 changes again, the hall signal changes from 011 to 001, the rotor 121 rotates to the second position L2, the timer of the commutation interval acquisition module 35 stops timing, the commutation interval acquisition module 35 transmits a real-time timing result to the controller 31, and the controller 31 compares the timing result of the commutation interval acquisition module 35 with a preset time threshold value to determine whether the current commutation interval becomes greater than or equal to the preset time threshold. When the commutation interval becomes greater than or equal to the preset time threshold, a second control signal is output as the control signal of the drive circuitry 32, specifically, when the commutation interval becomes greater than or equal to the preset time threshold, the controller 31 outputs the second control signal having an adjusted duty ratio to the drive circuitry 32 to gradually increase the rotational speed of the brushless motor 12 to the final speed.

Optionally, when the commutation interval of the brushless motor 12 becomes greater than or equal to the preset time threshold, the controller 31 outputs the second control signal to the drive circuitry 32 to gradually increase the rotational speed of the brushless motor 12 at a constant change rate or a variable change rate over time until the motor operates at the final speed. Specifically, the controller 31 adjusts the duty ratio of the PWM signal output to the drive circuitry 32 to increase the duty ratio of the PWM signal with a constant change rate or a variable change rate over time, thereby the rotational speed of the brushless motor 12 is gradually increased, until the brushless motor 12 operates at the final speed.

The commutation interval acquisition module 35 may detect a commutation interval of a sector and take the commutation interval of the sector as the commutation interval of the brushless motor 12. Of course, commutation intervals of multiple continuous or discontinuous sectors may also be detected, and an average value is taken as the commutation interval of the brushless motor 12.

According to the present disclosure, the impact is detected by the commutation interval detection, so that the impact can be detected before the impact occurs, the brushless motor 12 is controlled to operate from the initial speed to the final speed before the impact occurs, and adverse phenomena, such as the object is already fallen off when the rotational speed of the brushless motor 12 is adjusted after the impact, can be avoided. According to the present disclosure, an impact, which is about to occur, can be detected before it occurs, the nail holding effect is better, the adverse phenomena, such as the object is already fallen off when the motor rotational speed is adjusted after the impact, can be significantly avoided, and the nail holding device is more reliable and safe. In addition, the impact is detected through commutation interval, the detection method is simple and reliable, no additional electrical components are needed to be added, and the cost is lower.

A control method of a rotary impact tool is provided according to the present disclosure, the method includes steps described below.

The brushless motor 12 is caused to operate at an initial speed.

A commutation interval of the brushless motor 12 is acquired.

When the commutation interval of the brushless motor 12 becomes greater than or equal to a preset time threshold, a rotational speed of the brushless motor 12 is gradually increased to a final speed.

Optionally, a position of the rotor 121 of the brushless motor 12 is acquired; the commutation interval of the brushless motor 12 is determined based on a change of the position of the rotor of the brushless motor 12.

Optionally, the commutation interval of the brushless motor 12 is determined based on a time period during which the rotor 121 of the brushless motor 12 rotates from a first position to a second position, where the first position is a position where the brushless motor 12 starts a commutation, and the second position is a position where the brushless motor 12 starts a next commutation.

Optionally, the preset time threshold assumes a value that lies in the range of 1 millisecond to 50 milliseconds.

Figure 8:
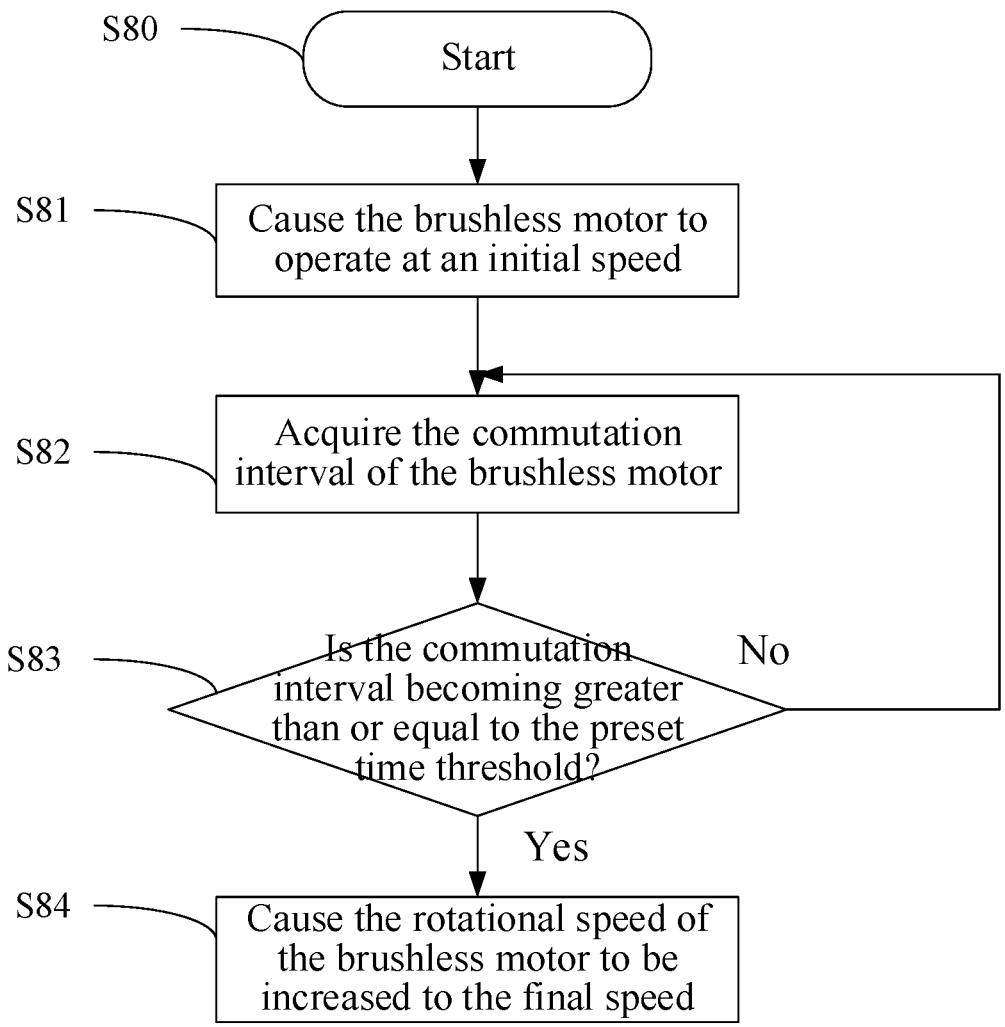
FIG. 8 is a flowchart of a control method of a rotary impact tool according to an example.

Referring to FIG. 8, the control method of a rotary impact tool 10 includes specified operations described as follows.

In step S80, the rotary impact tool 10 is initiated;

the operator triggers the operating member 15, the rotary impact tool 10 is powered on, and the system is initialized;

In step S81: the brushless motor 12 is caused to operate at an initial speed;

the controller 31 is powered on to control the operation of the drive circuitry 32, in an initial state, the controller 31 outputs a first control signal to the drive circuitry 32, specifically, the controller 31 outputs a PWM signal having a first duty ratio to control the switching elements of the drive circuitry 32 to turn on or off, so that the brushless motor 12 operates at the initial speed. In the initial state, the brushless motor 12 drives the screw to enter the material at a relatively low speed, and during the process, the rotary impact tool 10 does not generate a state in which the hammer portion impacts the anvil portion. The first duty ratio assumes a value that lies in the range of 10%-30%.

In step S82: the commutation interval of the brushless motor 12 is acquired;

the commutation interval acquisition module 35 detects the commutation interval of the brushless motor 12 according to the aforementioned detection process, and the controller 31 acquires the commutation interval of the brushless motor 12 detected by the commutation interval acquisition module 35.

That is, the controller 31 determines the commutation interval of the brushless motor 12 based on a change of the position of the rotor of the brushless motor 12. More specifically, the commutation interval of the brushless motor 12 is determined based on a time period during which the rotor 121 of the brushless motor 12 rotates from a first position to a second position, the first position is a position where the brushless motor 12 starts a commutation, and the second position is a position where the brushless motor 12 starts a next commutation.

In step S83: It is compared and determined whether the commutation interval becomes greater than or equal to the preset time threshold. If yes, step S84 is executed, or else step S82 is executed;

the controller 31 compares the obtained commutation interval of the brushless motor 12 with the preset time threshold and determines whether the commutation interval becomes greater than or equal to the preset time threshold. Optionally, the preset time threshold assumes a value that lies in the range of 1 millisecond to 50 milliseconds.

In step S84, the rotational speed of the brushless motor 12 is caused to be increased to the final speed;

after the brushless motor 12 operates at the initial speed and drives the screw to gradually enter the material, as a depth of the screw entering the material becomes deeper and deeper, a reaction force from the material to the screw is continuously increased, the rotational speed of the brushless motor 12 is correspondingly reduced (there is a tendency of stalling phenomenon), and the commutation interval of the brushless motor 12 will be gradually increased, when the commutation interval of the brushless motor 12 becomes greater than or equal to the preset time threshold, the controller 31 outputs the second control signal to the drive circuitry 32, the second control signal is a PWM signal, and the duty ratio of the second control signal is greater than the duty ratio of the first control signal. Specifically, the duty ratio of the second control signal is gradually increased to the final duty ratio having a constant change rate or a variational change rate, so that the rotational speed of the brushless motor 12 is gradually increased from the initial speed to the final speed of the normal operation to operate at the final speed. The change rate may be gradually increased or decreased to increase the rotational speed of the brushless motor 12 in different manners. The PWM signal having the final duty ratio controls the switching elements of the driving circuit 32 to turn on or off, so that the brushless motor 12 operates at the final speed, and thus the brushless motor 12 drives the screw to quickly enter the wood at the final speed.

After the screw has been driven into a desired position of the material, the brushless motor 12 stops the driving or the rotary impact tool 10 stops operation.

The rotary impact tool 10 operates at the initial speed lower than the final speed in the initial stage of initiation, thus the low-speed automatic nail holding effect without hands is realized and the operation is safer and more reliable. When it is determined that the commutation interval becomes greater than or equal to the preset time threshold, the rotational speed of the brushless motor 12 is changed to be gradually increased until the brushless motor 12 operates at the final speed higher than the initial speed, and the brushless motor 12 drives the screw to operate at a relatively large final state speed to implement fast nailing. The above-mentioned rotary impact tool 10 and its control method can ensure that the screw does not tilt, fall off or damage the material, screw head and tool head with remarkable effect.

Optionally, the rotary impact tool 10 further includes a voltage detection circuitry 36 configured for detecting a voltage of the battery pack 20. The voltage detection circuitry 36 is connected to the battery pack 20 and the controller 31. The controller 31 is configured to adjust the first control signal output to the drive circuitry 32 according to the voltage of the battery pack 20, so as to keep the initial speed of the brushless motor 12 substantially constant, so that when the rotary impact tool 10 uses the battery pack 20 with different voltages for power supply, or when the voltage of the battery pack 20 is reduced due to a long-term use, the initial speed of the brushless motor 12 may be kept substantially constant, which has advantages that the initial speed of the rotary impact tool 10 for the nail holding may be kept at an optimal speed for the nail holding, when the voltage of the battery pack 20 is different.

Specifically, when the battery pack 20 is detachably mounted onto the rotary impact tool 10, the voltage detection circuitry 36 is electrically connected to the positive power supply terminal 20a and the negative power supply terminal 20b of the battery pack 20 to detect the voltage of the battery pack 20. An output terminal of the voltage detection circuitry 36 is connected to the controller 31, and the controller 31 acquires the voltage of the battery pack 20 according to a detection result of the voltage detection circuitry 36, and adjusts the control signal output to the drive circuitry according to the voltage of the battery pack 20 to keep the initial speed of the brushless motor 12 substantially constant.

Specifically, the controller 31 compares the acquired voltage of the battery pack 20 with the preset voltage threshold. If the voltage of the battery pack 20 is lower than the preset threshold, the controller 31 outputs a PWM drive signal having a relatively large duty ratio to the drive circuitry 32, otherwise, the controller 31 outputs a PWM drive signal having a relatively small duty ratio to the drive circuitry 32. The controller 31 is configured to output the first control signal having the first duty ratio to the drive circuitry 32 to cause the brushless motor 12 operating at the first initial speed, when the voltage of the battery pack 20 becomes greater than or equal to the preset voltage threshold; and the first control signal having the second duty ratio is output to the drive circuitry 32 to cause the brushless motor 12 operating at the second initial speed, when the voltage of the battery pack 20 becomes less than the preset voltage threshold; the first initial speed and the second initial speed are equal or substantially equal. Optionally, the preset voltage threshold assumes a value that lies in the range of 0.4 to 0.8 times a rated voltage of the rotary impact tool. Optionally, the voltage of the battery pack 20 is greater than or equal to 0.2 times the rated voltage of the rotary impact tool 10.

In this way, the rotational speed of the brushless motor 12 can be kept substantially constant when the battery pack 20 with different voltages is used in the initial stage of initiation, and the rotational speed of the brushless motor 12 is not different in the initial stage of initiation, which is not influenced by an actual voltage drop of the battery pack 20 due to a long service time period, furthermore the effect of low-speed automatic nail holding of the rotary impact tool 10 will not be reduced even with the voltage drop of the battery pack 20. In addition, by such arrangement, it may further be possible to stabilize the nail holding effect of the rotary impact tool 10 while using the battery pack 20 with different voltage specifications.

Figure 9:
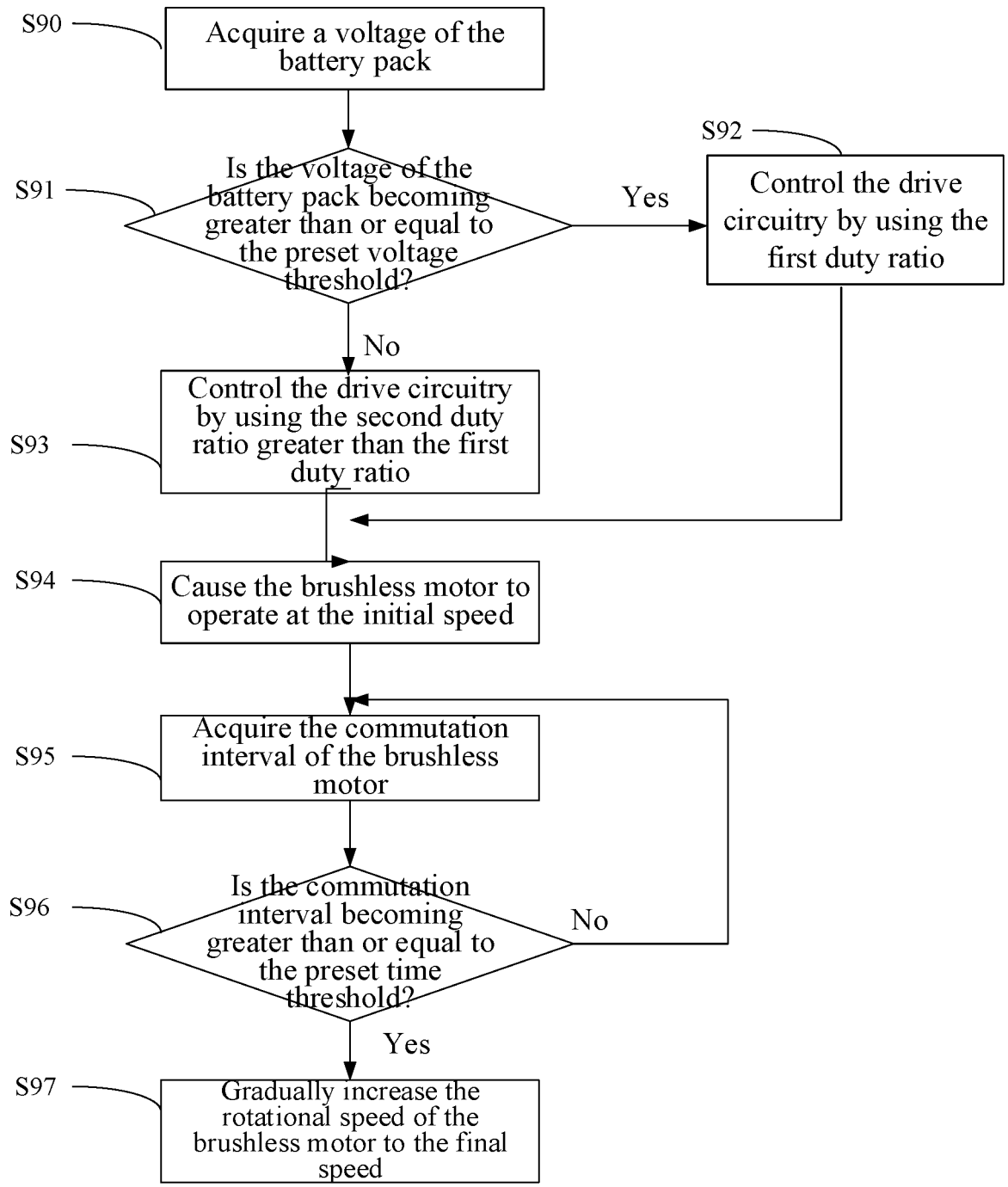
FIG. 9 is a flowchart of a control method of a rotary impact tool according to an example.

Referring to FIG. 9, the control method of a rotary impact tool according to another example includes steps described below.

In step S90, a voltage of the battery pack is acquired.

In this example, the controller 31 acquires the voltage of the battery pack 20 detected by the voltage detection circuitry 36.

In step S91: it is compared and determined whether the voltage of the battery pack 20 becomes greater than or equal to the preset voltage threshold, if yes, step S92 is executed, or else, step S93 is executed.

In step S92: the drive circuitry 32 is controlled by using the first duty ratio;

when the battery pack 20 has a detected voltage value greater than or equal to the preset voltage threshold value, the controller 31 control the switching elements of the driving circuit 32 to turn on or off by the first duty ratio, so that the brushless motor 12 is caused to operate at the first initial speed.

In step S93: the drive circuitry 32 is controlled by using the second duty ratio greater than the first duty ratio;

when the detected voltage value of the battery pack 20 becomes less than the preset voltage threshold, the controller 31 outputs the second duty ratio greater than the first duty ratio to control the drive circuitry 32, so that the brushless motor 12 is caused to operate at the second initial speed. The first initial speed and the second initial speed are equal or substantially equal.

In step S94: the brushless motor 12 is caused to operate at the initial speed;

The initial speed is one of the first initial speed and the second initial speed, the brushless motor 12 operates at the initial speed, and in this initial state, the brushless motor 12 drives the screw to enter the material at a relatively low speed, during which, the rotary impact tool 10 will not generate a state in which the hammer portion impacts the anvil portion. The first initial speed and the second initial speed are substantially equal to each other, so that the initial rotational speed of the brushless motor 12 is substantially constant when the battery pack 20 uses different voltages.

In step S95: the commutation interval of the brushless motor 12 is acquired.

The commutation interval acquisition module 35 detects and acquires the commutation interval of the motor 12 according to the aforementioned process, and the controller 31 acquires the commutation interval of the brushless motor 12 detected by the commutation interval acquisition module 35.

The commutation interval acquisition module 35 detects the commutation interval of the brushless motor 12 according to the aforementioned process, and the controller 31 acquires the commutation interval of the brushless motor 12 detected by the commutation interval acquisition module 35.

That is, the controller 31 determines the commutation interval of the brushless motor 12 based on a change of the position of the rotor 121 of the brushless motor 12. More specifically, the commutation interval of the brushless motor 12 is determined based on a time period during which the rotor 121 of the brushless motor 12 rotates from the first position to the second position; the first position is a position where the brushless motor 12 starts a commutation, and the second position is a position where the brushless motor 12 starts a next commutation.

In step S96: it is compared and determined whether the commutation interval becomes greater than or equal to the preset time threshold, if yes, step S97 is executed, or else, step S95 is executed;

the controller 31 compares the obtained commutation interval of the brushless motor 12 with the preset time threshold and determines whether the commutation interval becomes greater than or equal to the preset time threshold. Optionally, the preset time threshold assumes a value that lies in the range of 1 millisecond to 50 milliseconds.

In step S97: the rotational speed of the brushless motor 12 is gradually increased to the final speed.

When the commutation interval of the brushless motor 12 becomes greater than or equal to the preset time threshold, the controller 31 outputs the second control signal to the drive circuitry 32, and the second control signal is a PWM signal. The duty ratio of the second control signal is greater than the first duty ratio and the second duty ratio. Specifically, the duty ratio of the second control signal is gradually increased to the final duty ratio at a constant change rate or a variable change rate, so that the rotational speed of the brushless motor 12 is gradually increased from the initial speed to the final speed of the normal operation. The variable change rate may be gradually increased or decreased to increase the rotational speed of the brushless motor 12 in different manners. The PWM signal of the final duty ratio controls the switching elements of the driving circuit 32 to turn on or off, so that the brushless motor 12 operates at the final speed, thus the brushless motor 12 drives the screw to quickly enter the wood at the final speed.

After the screw has been driven into a desired position of the material, the brushless motor 12 stops the driving or the rotary impact tool 10 stops operation.

According to the above control method, the voltage of the battery pack 20 is detected and determined before the brushless motor 12 initiates, if the voltage of the battery pack 20 is relatively low, then a relatively large duty ratio is set, otherwise, a relatively small duty ratio is set, so that different low speeds of the brushless motor 12 at the initial initiation stage caused by the voltage drop of the battery pack 20 due to a long service time, and further a reduced nail holding effect of the rotary impact tool 10 due to the voltage drop can be avoided. In addition, through such arrangement, the rotary impact tool 10 may also use the battery pack 20 with different voltage specifications, and when the battery pack 20 with different voltage specifications are used, the nail holding effect is stable.

The rotary impact tool 10 of the present disclosure operates at a relatively low initial speed and detects an impact according to the commutation interval, so that the impact can be detected before it occurs, thus the brushless motor is controlled to operate from the initial speed to the final speed before the impact occurs, the adverse phenomena, such as the object is already fallen off when the rotational speed of the brushless motor is adjusted after the impact, can be avoided, an automatic nail holding effect is implemented at a low speed, the screw is prevented from being tilted, without holding hands it has higher efficiency and is simpler and safer to operate, a quick nail driving is implemented at a high speed, and the working efficiency is improved; in addition, the detection impact is imminent according to the commutation interval of the brushless motor, the detection method is simple and reliable, no additional electronic components or mechanical components are needed to be added, and the detection cost is low. According to the above manner, the rotary impact tool of the present disclosure can ensure that screws and so on do not tilt, fall off, or damage materials, etc., which is significantly effective.

The foregoing merely illustrates the basic principles, main features and advantages of the present disclosure. Those skilled in the art should understand that the foregoing examples do not limit the present disclosure in any form, and all technical solutions obtained by way of equivalent substitution or transformation shall all fall in the scope of protection of the present disclosure.

What is claimed is:

1. A rotary impact tool, comprising:
    an impact assembly, configured for generating an impact force;
    a brushless motor, configured for outputting a driving force to drive the impact assembly to generate the impact force;
    a transmission assembly, connected to the brushless motor and to the impact assembly and configured for transmitting the driving force of the brushless motor to the impact assembly;
    a drive circuitry, electrically connected to the brushless motor and configured for driving the brushless motor to output the driving force; and
    a controller, configured to:
        acquire a commutation interval of the brushless motor;
        output a first control signal to the drive circuitry causing the brushless motor to operate at a preset initial speed; and
        output a second control signal to the drive circuitry to gradually increase a rotational speed of the brushless motor to a preset final speed in response to the commutation interval of the brushless motor becoming greater than or equal to a preset time threshold, wherein the preset initial speed is less than the preset final speed,
    wherein the first control signal is a first pulse width modulation signal, the second control signal is a second pulse width modulation signal, and a duty ratio of the first pulse width modulation signal is less than a duty ratio of the second pulse width modulation signal, and
    wherein the first pulse width modulation signal has a duty ratio that lies in the range of 10% to 30%.

2. The rotary impact tool according to claim 1, wherein the brushless motor comprises a rotor and the controller is configured to acquire a position of the rotor of the brushless motor and determine the commutation interval of the brushless motor based on a change in the position of the rotor of the brushless motor.

3. The rotary impact tool according to claim 2, wherein the controller is configured to determine the commutation interval of the brushless motor based on a time period during which the rotor of the brushless motor rotates from a first position to a second position, and the first position is a position where the brushless motor starts a commutation and the second position is a position where the brushless motor starts a next commutation.

4. The rotary impact tool according to claim 1, wherein a control signal of the brushless motor operating at no load is defined as a third control signal, the first control signal is the first pulse width modulation signal and the third control signal is a third pulse width modulation signal, and when a duty ratio of the first pulse width modulation signal is the same as the duty ratio of the third pulse width modulation signal, the preset time threshold is greater than the commutation interval of the brushless motor operating at no load.

5. The rotary impact tool according to claim 1, wherein the impact assembly comprises:
a hammer portion;
an anvil portion, arranged corresponding to the hammer portion; and
a spring, arranged between the transmission assembly and the hammer portion and configured for being compressed by the transmission assembly to push the hammer portion to impact the anvil portion;
wherein the preset time threshold is less than or equal to the commutation interval of the spring measured from the point of being compressed to the point of generating a maximum elastic force; wherein maximum elastic force is operative to drive the hammer portion to impact the anvil portion.

6. The rotary impact tool according to claim 1, wherein the preset time threshold assumes a value that lies in the range of 1 millisecond to 50 milliseconds.

7. The rotary impact tool according to claim 1, further comprising a battery pack configured for supplying power to the rotary impact tool, wherein the battery pack is detachably mounted onto the rotary impact tool.

8. The rotary impact tool according to claim 7, further comprising a voltage detection circuitry, configured for detecting a voltage of the battery pack, wherein the controller is further configured to adjust the first control signal output to the drive circuitry according to the voltage of the battery pack to keep the initial speed of the brushless motor substantially unchanged.

9. The rotary impact tool according to claim 8, wherein the first control signal is a pulse width modulation signal; and the controller is configured to:
in response to the voltage of the battery pack becoming greater than or equal to a preset voltage threshold, output the first control signal having a first duty ratio to the drive circuitry causing the brushless motor to operate at a first initial speed; and
in response to the voltage of the battery pack becoming less than the preset voltage threshold, output the first control signal having a second duty ratio to the drive circuitry causing the brushless motor to operate at a second initial speed; and
wherein the first initial speed is equal to or substantially equal to the second initial speed, and the initial speed is selected as one of the first initial speed and the second initial speed.

10. The rotary impact tool according to claim 9, wherein the preset voltage threshold assumes a value that lies in the range of 0.4 to 0.8 times a rated voltage of the rotary impact tool.

11. The rotary impact tool according to claim 1, wherein the rotary impact tool is an impact screwdriver.

12. A rotary impact tool, comprising:
an impact assembly, configured for generating an impact force;
a brushless motor, configured for outputting a driving force to drive the impact assembly to generate the impact force;
a transmission assembly, connected to the brushless motor and to the impact assembly and configured for transmitting the driving force of the brushless motor to the impact assembly;
a drive circuitry, electrically connected to the brushless motor and configured for driving the brushless motor to output the driving force; and
a controller, configured to:
acquire a commutation interval of the brushless motor;
output a first control signal to the drive circuitry causing the brushless motor to operate at a preset initial speed; and
output a second control signal to the drive circuitry to gradually increase a rotational speed of the brushless motor to a preset final speed in response to the commutation interval of the brushless motor becoming greater than or equal to a preset time threshold, wherein the preset initial speed is less than the preset final speed, and
wherein a control signal of the brushless motor operating at no load is defined as a third control signal, the first control signal is a first pulse width modulation signal and the third control signal is a third pulse width modulation signal, and when a duty ratio of the first pulse width modulation signal is the same as the duty ratio of the third pulse width modulation signal, the preset time threshold is greater than the commutation interval of the brushless motor operating at no load.

13. A rotary impact tool, comprising:
an impact assembly, configured for generating an impact force;
a brushless motor, configured for outputting a driving force to drive the impact assembly to generate the impact force;
a transmission assembly, connected to the brushless motor and to the impact assembly and configured for transmitting the driving force of the brushless motor to the impact assembly;
a drive circuitry, electrically connected to the brushless motor and configured for driving the brushless motor to output the driving force; and
a controller, configured to:
acquire a commutation interval of the brushless motor;
output a first control signal to the drive circuitry causing the brushless motor to operate at a preset initial speed; and
output a second control signal to the drive circuitry to gradually increase a rotational speed of the brushless motor to a preset final speed in response to the commutation interval of the brushless motor becoming greater than or equal to a preset time threshold, wherein the preset initial speed is less than the preset final speed, wherein the impact assembly comprises:
a hammer portion;
an anvil portion, arranged corresponding to the hammer portion; and
a spring, arranged between the transmission assembly and the hammer portion and configured for being compressed by the transmission assembly to push the hammer portion to impact the anvil portion;
wherein the preset time threshold is less than or equal to the commutation interval of the spring measured from the point of being compressed to the point of generating a maximum elastic force; wherein maximum elastic force is operative to drive the hammer portion to impact the anvil portion.

* * * * *